United States Patent
Hundt et al.

(10) Patent No.: US 7,249,349 B2
(45) Date of Patent: Jul. 24, 2007

(54) UNINSTRUMENTING IN-LINE CODE INSTRUMENTATION ON-THE-FLY

(75) Inventors: Robert Hundt, Santa Clara, CA (US); David John Babcock, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 591 days.

(21) Appl. No.: 10/017,342

(22) Filed: Dec. 13, 2001

(65) Prior Publication Data

US 2003/0115583 A1 Jun. 19, 2003

(51) Int. Cl.
*G06F 9/44* (2006.01)

(52) U.S. Cl. .................... 717/130; 717/127

(58) Field of Classification Search ........ 717/127–133, 717/148, 154, 158–159, 140
See application file for complete search history.

(56) References Cited

U.S. PATENT DOCUMENTS

| | | | |
|---|---|---|---|
| 6,189,141 B1* | 2/2001 | Benitez et al. ............... | 717/153 |
| 6,397,382 B1* | 5/2002 | Dawson ....................... | 717/130 |
| 6,681,387 B1* | 1/2004 | Hwu et al. ................... | 717/158 |
| 6,732,357 B1* | 5/2004 | Berry et al. .................. | 717/158 |

OTHER PUBLICATIONS

Malony, A 'Event-Based Performance Perturbation: A Case Study' 1991, ACM.*
"Unix Programming Frequently Asked Questions—1. Process Control"; http://www.erlenstar.demon.co.uk/unix/faq_2.html; archived by the 'the wayback machine' Mar. 2, 1999.*

* cited by examiner

*Primary Examiner*—Meng-Al T. An
*Assistant Examiner*—Jason Mitchell (57) ABSTRACT

A method and system for reverting a process in an in-line instrumented state to an uninstrumented state. In one embodiment, the present invention modifies selected text segment portions from the process to be uninstrumented. The present embodiment then unmaps instrumented code space such that the instrumented code space is inaccessible to the process. In this embodiment, provided an instruction pointer resides in the instrumented code space, the present invention updates the instruction pointer to uninstrumented code space. The present embodiment also executes the process and, provided the process generates a fault by seeking to access an address in instrumented code space, provides a corresponding address in uninstrumented code space. In one embodiment, the present invention then continues execution at the address in instrumented code space.

15 Claims, 5 Drawing Sheets

FIG.1

PRIOR ART

UNINSTRUMENTING IN-LINE CODE INSTRUMENTATION ON-THE-FLY

TECHNICAL FIELD

The present claimed invention relates to instrumentation of a computer program during execution. More specifically, the present claimed invention relates to reverting an instrumented process to an uninstrumented state.

BACKGROUND ART

Code instrumentation is a method for analyzing and evaluating program code performance. In one approach to code instrumentation, new instructions (or probe code) are added to the program, and, consequently, the original code in the program is changed and/or relocated. Some examples of probe code include adding values to a register, moving the content of one register to another register, moving the address of some data to some registers, etc. The changed and/or relocated code is referred to as instrumented code or, more generally, as an instrumented process. For purposes of the present discussion, instrumented code is one type of dynamically generated code. Although the following discussion explicitly recites and discusses code instrumentation, such discussion and examples are for illustration only. That is, the following discussion also applies to various other types of dynamically generated code.

One specific type of code instrumentation is referred to as dynamic binary instrumentation. Dynamic binary instrumentation allows program instructions to be changed on-the-fly. Measurements such as basic-block coverage and function invocation counting can be accurately determined using dynamic binary instrumentation. Additionally, dynamic binary instrumentation, as opposed to static instrumentation, is performed at run-time of a program and only instruments those parts of an executable that are actually executed. This minimizes the overhead imposed by the instrumentation process itself. Furthermore, performance analysis tools based on dynamic binary instrumentation require no special preparation of an executable such as, for example, a modified build or link process.

Unfortunately, dynamic binary instrumentation does have some disadvantages associated therewith. For example, because the binary code of a program is modified when using dynamic binary instrumentation methods, all interactions with the processor and operating system may change significantly, for example a program's cache and paging behavior. As a result, dynamic binary instrumentation is considered to be intrusive. Also, due to the additional instructions introduced by dynamic binary instrumentation, process execution time can slow to anywhere from some small amount of increased run time to multiples of the run time of the non-instrumented process.

In one approach, dynamic binary instrumentation is performed in an in-line manner. That is, probe code is inserted into a code stream of interest. As a result, existing code must be relocated to new memory space because of increase in size of the original code stream due to the addition of probe code instructions. As compared to out-of-line approaches, an in-line approach leads to more compact code, less intrusion, and better performance. That is, in a typical out-of-line approach, a function's entry point is instrumented with a long branch to a trampoline that executes the instruction plus additional code related to the instrumentation taking place. In the in-line approach, such long branching to the trampoline is avoided. However, an in-line strategy does have drawbacks. For example, the insertion of probe code changes the relative offsets in a code stream and requires lookup of indirect branches (e.g. in a translation table) whose target cannot be determined by the instrumentor. Also, combining different instrumentations and probe code is not as easy as it is in certain out-of-line approaches. One drawback associated with in-line instrumented processes is particularly troublesome. Namely, in some instances it is desirable or necessary to reverse the dynamic binary in-line instrumentation operation, i.e., to undo the instrumentation and revert back to executing the original code. For example, "undoing" the instrumentation (i.e. uninstrumenting a process) is useful when an application is to be measured for only a part of its total runtime.

As another example, uninstrumentation may also be desired due to the following circumstance. Assume that a process has been instrumented to collect certain measurements. This process being measured (the parent process) may create new processes (the child processes). In UNIX, the most common way to create a new process is to call the C function fork() from the parent process. It may be required to exclude some (or all) of the child processes from the measurement of the parent process. That is, it is possible that the child process will inherit the parent's complete context. As is the case in dynamic binary in-line instrumentation, this complete context includes the parent's program text (i.e. instructions) that may have been modified by instrumentation. The instrumented code space can be generated by calling the target application's memory allocator, by mapping of shared memory, or by reserving an address range on the target application's stack. If no special handling is done at this point, the child process will execute the inherited instrumented code from the parent, thereby perturbing the measurements being made exclusively on the parent process.

Thus, a need has arisen for a method and system for reverting a process in an in-line instrumented state to an uninstrumented state.

DISCLOSURE OF THE INVENTION

The present invention provides a method and system for reverting a process in an in-line instrumented state to an uninstrumented state.

Specifically, in one method embodiment, the present invention modifies selected text segment portions from the process to be uninstrumented. The present embodiment then unmaps instrumented code space such that the instrumented code space is inaccessible to the process. In this embodiment, provided an instruction pointer resides in the instrumented code space, the present invention updates the instruction pointer to uninstrumented code space. The present embodiment also executes the process and, provided the process generates a fault by seeking to access an address in instrumented code space, provides a corresponding address in uninstrumented code space. In one embodiment, the present invention then continues execution at the address in instrumented code space.

These and other technical advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should be understood as not being drawn to scale except if specifically noted.

BEST MODES FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "modifying", "unmapping", "updating", "executing", "unwinding", or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

Computer System Environment of the Present Invention

Figure 1:
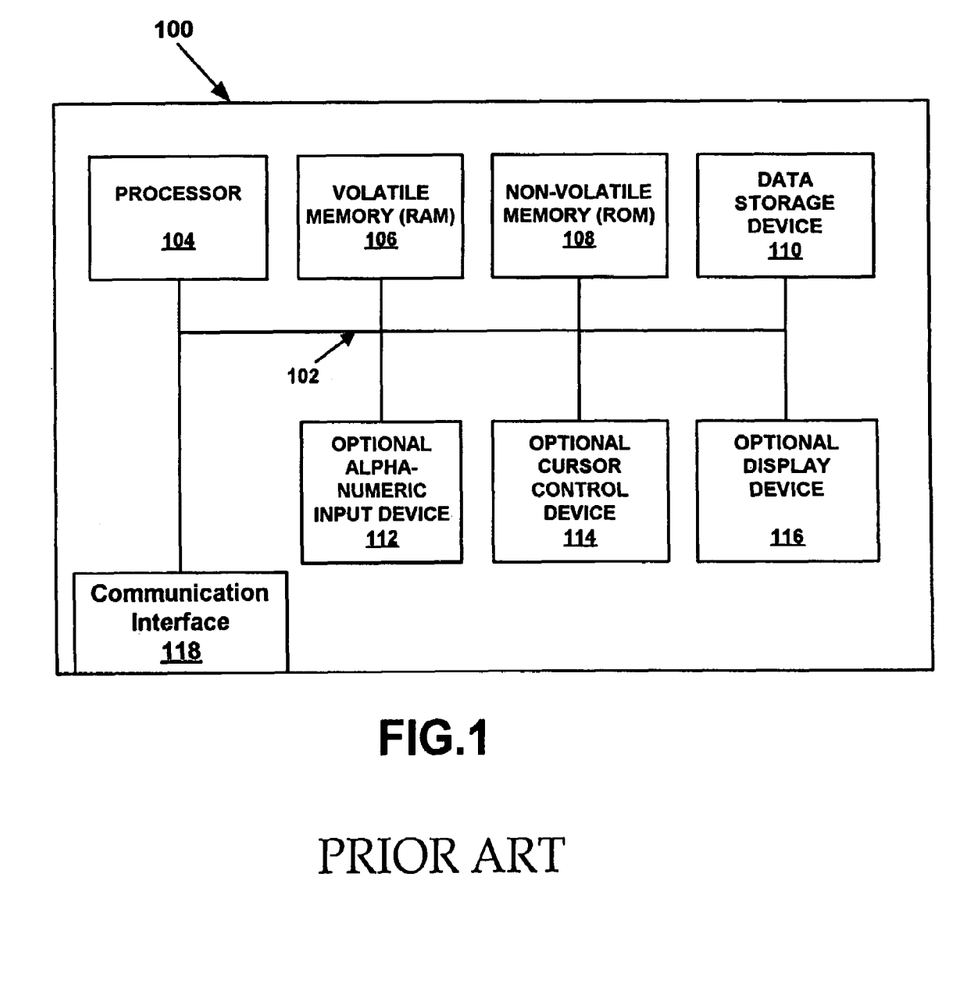
FIG. 1 is a schematic diagram of an exemplary computer system used to perform steps of the present method in accordance with various embodiments of the present claimed invention.

With reference now to FIG. 1, portions of the present method and system are comprised of computer-readable and computer-executable instructions which reside, for example, in computer-usable media of a computer system. FIG. 1 illustrates an exemplary computer system 100 used in accordance with one embodiment of the present invention. It is appreciated that system 100 of FIG. 1 is exemplary only and that the present invention can operate on or within a number of different computer systems including general purpose networked computer systems, embedded computer systems, routers, switches, server devices, client devices, various intermediate devices/nodes, stand alone computer systems, and the like. Additionally, computer system 100 of FIG. 1 is well adapted having computer readable media such as, for example, a floppy disk, a compact disc, and the like coupled thereto. Such computer readable media is not shown coupled to computer system 100 in FIG. 1 for purposes of clarity. Additionally, portions of the present embodiment are well suited to operating in conjunction with various mobile clients such as, for example, a cell phone, personal digital assistant (PDA), laptop computer, pager, and the like.

System 100 of FIG. 1 includes an address/data bus 102 for communicating information, and a central processor unit 104 coupled to bus 102 for processing information and instructions. As an example, central processor unit 104 may be an IA-64 microprocessor architecture by Intel Corporation of Santa Clara, Calif. System 100 also includes data storage features such as a computer usable volatile memory 106, e.g. random access memory (RAM), coupled to bus 102 for storing information and instructions for central processor unit 104. System 100 also includes computer usable non-volatile memory 108, e.g. read only memory (ROM), coupled to bus 102 for storing static information and instructions for the central processor unit 104. Such static information is comprised, in one embodiment, of commands for configuration and initial operations of computer system 100. Computer system 100 also includes a data storage unit 110 (e.g., a magnetic or optical disk and disk drive) coupled to bus 102 for storing information and instructions.

System 100 of the present invention also includes an optional alphanumeric input device 112 including alphanumeric and function keys coupled to bus 102 for communicating information and command selections to central processor unit 104. System 100 also optionally includes an optional cursor control device 114 coupled to bus 102 for communicating user input information and command selections to central processor unit 104. System 100 of the present embodiment also includes an optional display device 116 coupled to bus 102 for displaying information. System 100 of the present embodiment also includes a communication interface 118 which enables computer system 100 to interface with other computers or devices. In one embodiment, communication 118 is, for example, a modem, an integrated services digital network (ISDN) card or the like, a local area network (LAN) port, etc. Those skilled in the art will recognize that modems or various types of network interface cards (NICs) typically provide data communications via telephone lines, while a LAN port provides data communications via a LAN. Communication interface 118 of computer system 100 may also enable wireless communications. Furthermore, communication interface 118 may enable communication with other computers or devices through one or more networks. For example, computer system 100, using communication interface 118, may communicate to the "Internet."

Computer system 100 may be used to implement the techniques described below. In various embodiments, processor 104 performs the steps of the techniques by executing instructions brought to RAM 106. In alternative embodiments, hard-wired circuitry may be used in place of or in combination with software instructions to implement the described techniques. Consequently, embodiments of the invention are not limited to any one or a combination of software, hardware, or circuitry.

Instructions executed by processor 104 may be stored in and carried through one or more computer-readable media, which refer to any medium from which a computer reads information. Computer-readable media may be, for example, a floppy disk, a hard disk, a zip-drive cartridge, a magnetic tape, or any other magnetic medium, a CD-ROM, a CD-RAM, a DVD-ROM, a DVD-RAM, or any other optical medium, paper-tape, punch-cards, or any other physical medium having patterns of holes, a RAM, a ROM, an EPROM, or any other memory chip or cartridge. Computer-readable media may also be coaxial cables, copper wire, fiber optics, acoustic, or light waves, etc. As an example, the instructions to be executed by processor 104 are in the form of one or more software programs and are initially stored in a CD-ROM being interfaced with computer system 100. Computer system 100 loads these instructions in RAM 106, executes some instructions, and sends some instructions via communication interface 118, a modem, and a telephone line to a network, the Internet, etc. A remote computer, receiving data through a network cable, executes the received instructions and sends the data to computer system 100 to be stored in storage device 110.

Referring still to FIG. 1, optional display device 116 of FIG. 1, may be a liquid crystal device, cathode ray tube, or other display device suitable for creating graphic images and alphanumeric characters recognizable to a user. Optional cursor control device 114 allows the computer user to dynamically signal the two dimensional movement of a visible symbol (cursor) on a display screen of display device 116. Many implementations of cursor control device 114 are known in the art including a trackball, mouse, touch pad, joystick or special keys on alphanumeric input device 112 capable of signaling movement of a given direction or manner of displacement. Alternatively, it will be appreciated that a cursor can be directed and/or activated via input from alphanumeric input device 112 using special keys and key sequence commands. The present invention is also well suited to directing a cursor by other means such as, for example, voice commands. A more detailed discussion of the present invention is found below.

General Method and System for Uninstrumenting In-Line Code Instrumentation On-The-Fly As an overview, the present invention provides a method and system for reverting a process in an in-line instrumented state to an uninstrumented state.

Figure 2:
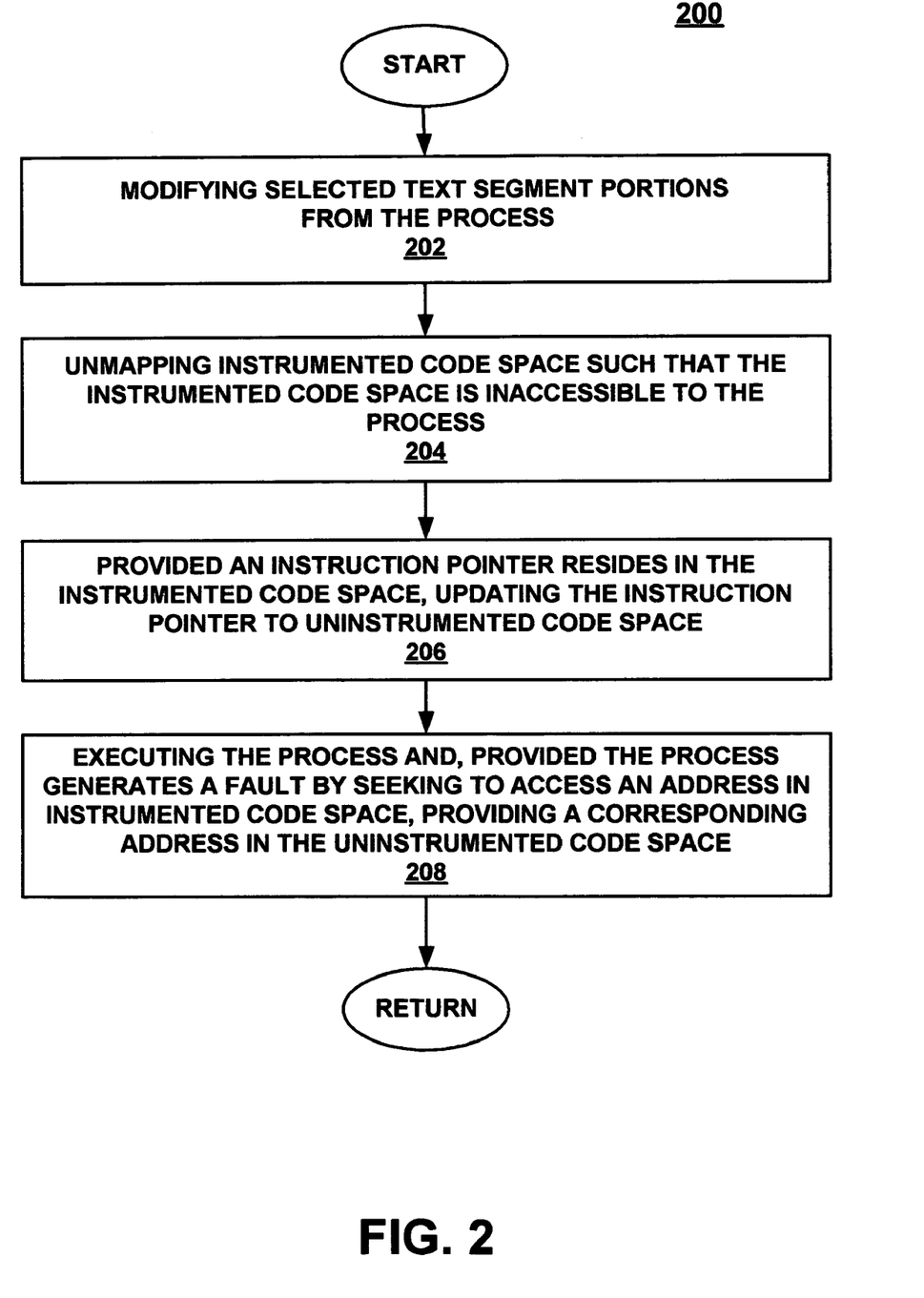
FIG. 2 is a flow chart of steps performed in accordance with one embodiment of the present claimed invention.

With reference next to flow chart 200 and to FIG. 1, exemplary steps used by the various embodiments of present invention are illustrated. Flow chart 200 includes processes of the present invention which, in one embodiment, are carried out by a processor under the control of computer-readable and computer-executable instructions. The computer-readable and computer-executable instructions reside, for example, in data storage features such as computer usable volatile memory 106, computer usable non-volatile memory 108, and/or data storage device 110 of FIG. 1. In one embodiment, the computer-readable and computer-executable instructions are used to control or operate in conjunction with, for example, processor 104 of FIG. 1.

With reference again to FIG. 2, steps performed in accordance with one embodiment of the present invention are shown. Although specific steps are disclosed in flow chart 200 of FIG. 2, such steps are exemplary. That is, the present invention is well suited to performing various other steps or variations of the steps recited in FIG. 2. At step 202, the present embodiment, modifies selected text segment portions from the process which has been instrumented. As was mentioned above, the need for uninstrumentation may arise when a child process inherits the instrumented parent process' complete context including the parent's program text that may have been modified by instrumentation. In such a case, if no special handling is done at this point, the child process will execute the inherited instrumented code from the parent, thereby perturbing the measurements intended to be made exclusively on the parent process. In order to exclude the child process from any measurements, uninstrumentation as is taught by the present invention is performed on the child process.

With reference still to step 202, in one embodiment, the present invention modifies selected text segment portions to remove breakpoints, branches, switch tables, procedure lookup tables (PLTs) to instrumented code space. In so doing, the instrumented process now more closely resembles the uninstrumented process. Specifically, the text segment is reverted to its original state. In one embodiment, processor 104 of FIG. 1 in conjunction with instructions, residing, for example, in RAM 106, ROM 108, and/or data storage device 110, comprise an apparatus which operates to perform step 202. Additional details related to instrumentation including discussion of features such as breakpoints, branches, switch tables, procedure lookup tables (PLTs) can be found in co-owned, commonly-assigned U.S. patent application Ser. No. 09/833,248 filed Apr. 11, 2001, entitled "Dynamic Instrumentation Of An Executable Program", to Hundt et al. which is incorporated herein by reference as background material.

As recited at step 204, the present embodiment also unmaps instrumented code space such that the instrumented code space is inaccessible to the process which is being uninstrumented. The present invention performs this step to rectify, for example, the case wherein the child process inherits the instrumented parent process' complete context including the mapped shared memory segments. Also, in one embodiment control transfers to the instrumented code in shared memory via branches in the text section are undone by restoring the process's original text segment. Similarly, in one embodiment, patched data such as switch tables are restored to their original state by reading the binary file.

Referring still to step 204, in one embodiment, the instrumented code space is comprised of shared memory. Although shared memory is specifically recited as comprising the instrumented code space in the present embodiment, the present invention is well suited to umapping from various other types of instrumented code space other than shared memory. In one embodiment, processor 104 of FIG. 1 in conjunction with instructions residing, for example, in RAM 106, ROM 108, and/or data storage device 110 comprise an apparatus which operates to perform step 204.

Referring now to step 206, the present invention also updates an instruction pointer to uninstrumented code space; provided an instruction pointer resides in instrumented code space. Once again, the present invention performs this step to rectify, for example, the case wherein the child process inherits the instrumented parent process' complete context including the parent's return call stack. However, when in-line instrumentation is used, the call stack of the process to be uninstrumented will contain addresses in the instrumented address range. One source of complexity in the uninstrumentation phase comes from the necessity to clean up this call stack. A detailed illustration of the present embodiment's performance of step 206 is presented below.

Figure 3:
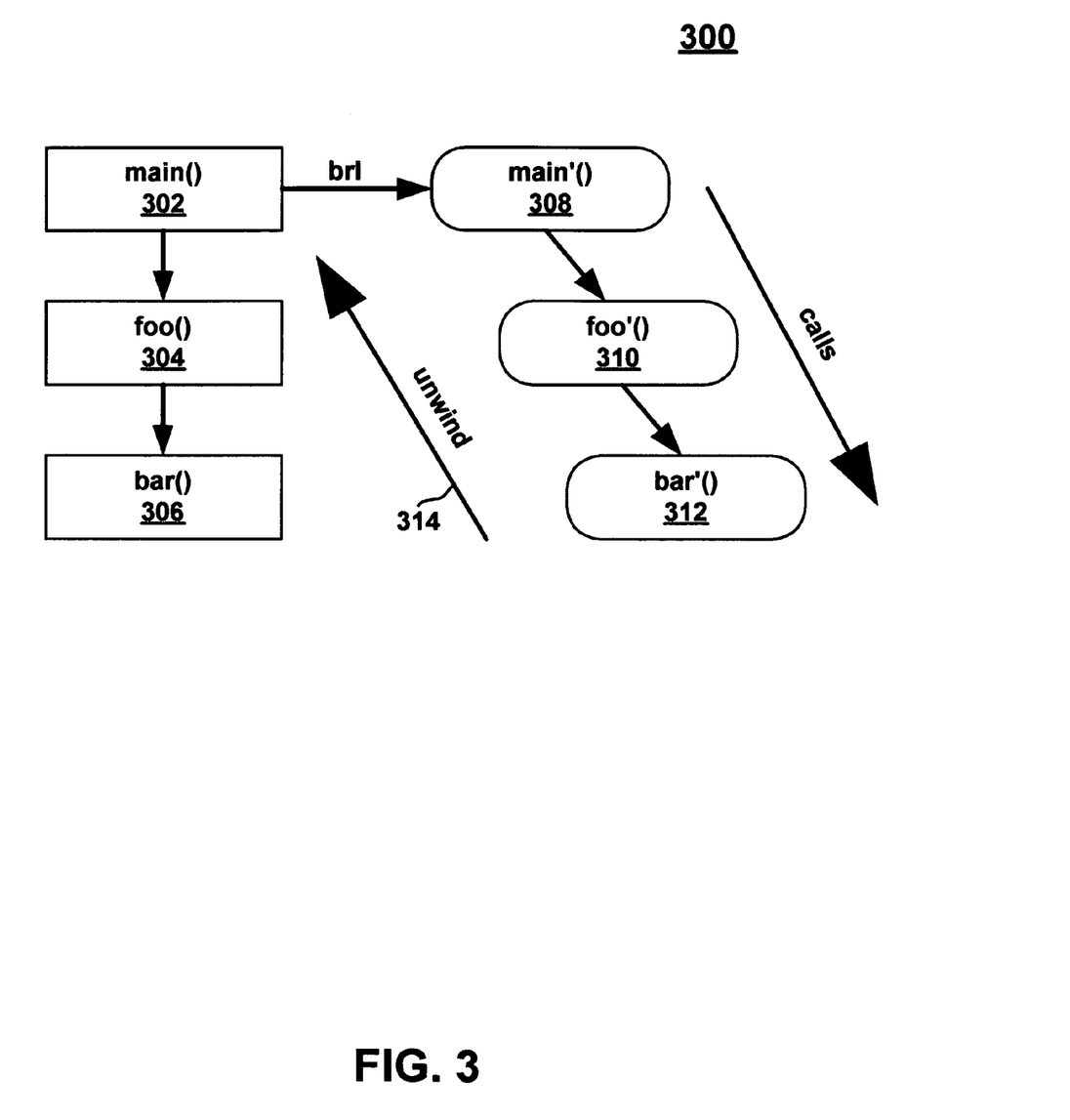
FIG. 3 is an original call graph and a corresponding instrumented call graph in accordance with one embodiment of the present claimed invention.

With reference now to FIG. 3, an original and a corresponding instrumented call graph 300 is shown. As shown in FIG. 3, assume function main() 302 calls function foo() 304 which calls function bar() 306 as shown below:

```
main()   foo()   bar()
{        {       {
foo();   bar();  ...
}        }       }
```

After instrumentation, the resulting call stack will contain instrumented functions as indicated in FIG. 3. In FIG. 3, unwinding traverses the call graph upwards as indicated by arrow 314. In certain environments such as, for example, IA-64 Itanium processor architecture by Intel Corporation of Santa Clara, Calif., the runtime architecture defines function calls, preserved registers, and conventions for passing parameters. For purposes of the below explanation, one method of the present invention is described as it would be implemented in such an environment. It should be understood, however, that such an example is exemplary only, and the present invention is not limited solely to use in such an environment. Furthermore, it should be noted that the unwind process which is readily performed in certain environments is particularly problematic in an IA-64 architecture. More specifically, in an IA-64 architecture, a system library "libunwind" is employed to facilitate the unwind process.

Referring still to FIG. 3 and also to step 206, to perform a call, a br.call instruction assigns the return address to a branch register—the return pointer (rp)—before branching to the target address. If the called function (the callee) plans to perform other calls, it has to save and restore the return pointer. On return of a function, a br.ret instruction uses the return pointer to return to the address after the original br.call. On the IA-64 architecture, such an address would be the bundle address after the bundle that contains the call.

The return pointer can be stored in a variety of places, on the memory stack, in a preserved register, in a stacked register, in another branch register. The information where the return pointer is saved is stored in the unwind information present in the process' executable linkage file (ELF), along with other information. The compiler generated code will reload the return pointer from the correct resource, before performing a function return. In the present embodiment, an instruction pointer (IP) residing in an instrumented function bar'() 312 must be reset to the corresponding IP in the non-instrumented function bar() 306. If bar'() 312 has been called from the instrumented function foo'() 310, the return pointer will contain an address within the instrumented foo'() 310. If the return pointer has already been saved as described above, then the resource holding the return pointer will hold an instrumented address.

During uninstrumentation on-the-fly, on returning from bar() 306 no branch back to its instrumented caller foo'() 310 must be taken, because the shared memory segment containing foo'() 310 may already have been unmapped and foo'() 310 may no longer be present in the current context. In one embodiment, a processor such as, for example, processor 104 of FIG. 1 in conjunction with instructions, residing, for example, in RAM 106, ROM 108, and/or data storage device 110, comprise an apparatus which operates to perform step 206.

With reference now to step 208, the present embodiment also executes the process which is being uninstrumented and, provided the process generates a fault by seeking to access an address in instrumented code space, provides a corresponding address in the uninstrumented code space. More specifically, in one embodiment, the present invention executes the process being uninstrumented and checks for segment faults (i.e. faults generated by seeking to access the now unmapped instrumented code space). When such a fault is detected, the present embodiment then corrects the fault by providing an address in the uninstrumented code space which corresponds to the fault-generating address in the instrumented code space. In one embodiment, a processor such as, for example, processor 104 of FIG. 1 in conjunction with instructions, residing, for example, in RAM 106, ROM 108, and/or data storage device 110, comprise an apparatus which operates to perform step 208.

Figure 4:
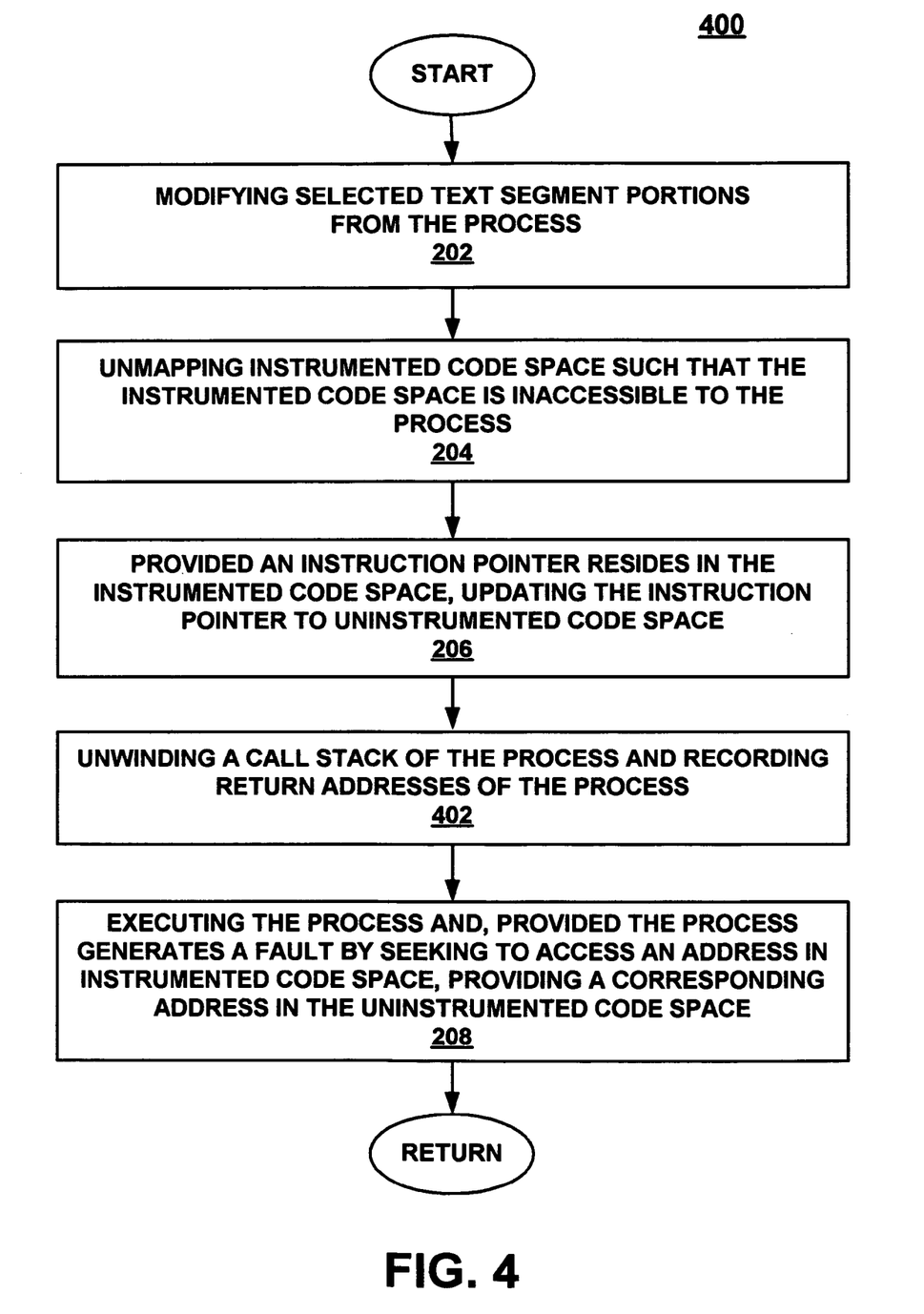
FIG. 4 is a flow chart of steps performed in accordance with another embodiment of the present claimed invention.

With reference now to FIG. 4, a flow chart 400 of steps performed in accordance with another embodiment of the present invention is shown. The method of the present embodiment includes steps 202, 204, 206, and 208 of FIG. 2. These steps were described above in detail in conjunction with the description of FIG. 2, and are not repeated herein for purposes of brevity and clarity. The method of the present embodiment as described in FIG. 4 also includes new step 402. At step 402, the present embodiment unwinds the call stack of the process being uninstrumented and records return addresses of the process. In one embodiment, a processor such as, for example, processor 104 of FIG. 1 in conjunction with instructions, residing, for example, in RAM 106, ROM 108, and/or data storage device 110, comprise an apparatus which operates to perform step 402.

Figure 5:
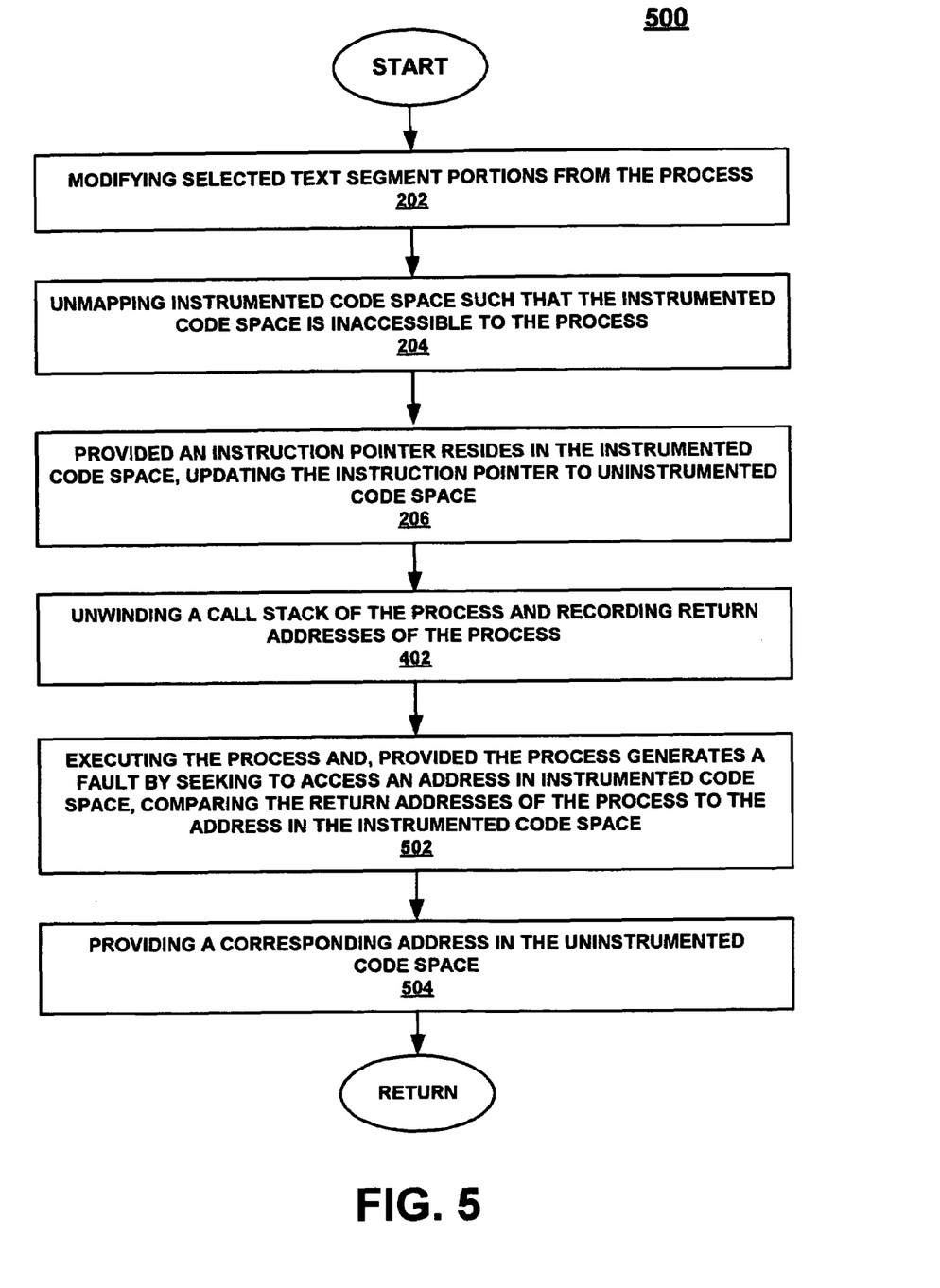
FIG. 5 is a flow chart of steps performed in accordance with yet another embodiment of the present claimed invention.

With reference now to FIG. 5, a flow chart 500 of steps performed in accordance with another embodiment of the present invention is shown. The method of the present embodiment includes steps 202, 204, 206, of FIG. 2 and step 402 of FIG. 4. These steps were described above in detail in conjunction with the description of FIG. 4, and are not repeated herein for purposes of brevity and clarity. The method of the present embodiment as described in FIG. 5 also includes new steps 502 and 504. At step 502, the present embodiment executes the process which is being uninstrumented and, provided the process generates a fault by seeking to access an address in instrumented code space, compares the return addresses of the process (i.e. those return addresses recorded at step 402) to the address in the instrumented code space which generated the fault upon execution of said process. In so doing, the present embodiment provides evidence that the fault is due to an invalid return address (i.e. a return address which resides in unmapped instrumented code space). In one embodiment, a processor such as, for example, processor 104 of FIG. 1 in conjunction with instructions, residing, for example, in RAM 106, ROM 108, and/or data storage device 110, comprise an apparatus which operates to perform step 502.

At step 504, the present embodiment then corrects the fault by providing an address in the uninstrumented code space which corresponds to the fault-generating address in the instrumented code space. In one embodiment, a processor such as, for example, processor 104 of FIG. 1 in conjunction with instructions, residing, for example, in RAM 106, ROM 108, and/or data storage device 110, comprise an apparatus which operates to perform step 504.

Thus, the present invention provides a method and system for reverting a process in an in-line instrumented state to an uninstrumented state.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

The invention claimed is:

1. A computer-implemented method of reverting a process in an in-line instrumented state to an uninstrumented state, said method comprising:

receiving a child process having inherited an instrumented parent process' context including the parent's program text that may have been modified by instrumentation resulting in an instrumented code space;

modifying text segment portions selected from said child process resulting in an uninstrumented code space that is an uninstrumented version of said instrumented code space;

unmapping said instrumented code space such that said instrumented code space is inaccessible to said child process;

provided an instruction pointer resides in said instrumented code space, updating said instruction pointer to point to said uninstrumented code space; and executing said child process and, provided said child process generates a fault by seeking to access an address in said instrumented code space which is inaccessible due to being unmapped, providing an address in said uninstrumented code space that corresponds to said address in said instrumented code.

2. The computer-implemented method for reverting a process in an in-line instrumented state to an uninstrumented state as recited in claim 1 wherein said selected text segment portions are selected from the group consisting of: breakpoints, branches, switch tables, procedure lookup tables (PLTs) for said instrumented code space.

3. The computer-implemented method for reverting a process in an in-line instrumented state to an uninstrumented state as recited in claim 1 wherein said instrumented code space is comprised of shared memory.

4. The computer-implemented method for reverting a process in an in-line instrumented state to an uninstrumented state as recited in claim 1 further comprising: unwinding a call stack of said child process and recording return addresses of said child process.

5. The computer-implemented method for reverting a process in an in-line instrumented state to an uninstrumented state as recited in claim 4 further comprising: comparing said return addresses of said child process to said address in said instrumented code space which generated said fault upon execution of said child process.

6. A computer-readable storage medium embodying instructions that cause a computer to perform a method for reverting a process in an in-line instrumented state to an uninstrumented state, the method comprising:

receiving a child process having inherited an instrumented parent process'context including the parent's program text that may have been modified by instrumentation resulting in an instrumented code space;

modifying text segment portions selected from said child process resulting in an uninstrumented code space that is an uninstrumented version of said instrumented code space;

unmapping said instrumented code space such that said instrumented code space is inaccessible to said child process;

provided an instruction pointer resides in said instrumented code space, updating said instruction pointer to point to said uninstrumented code space; and executing said child process and, provided said child process generates a fault by seeking to access an address in said instrumented code space which is inaccessible due to being unmapped, providing an address in said uninstrumented code space that corresponds to said address in said instrumented code.

7. The computer-readable medium of claim 6 wherein said selected text segment portions are selected from the group consisting of: breakpoints, branches, switch tables, procedure lookup tables (PLTs) for said instrumented code space.

8. The computer-readable medium of claim 6 wherein said instrumented code space is comprised of shared memory.

9. The computer-readable medium of claim 6 wherein said instructions further cause said computer to: unwind a call stack of said child process and record return addresses of said child process.

10. The computer-readable medium of claim 9 wherein said instructions further cause said computer to: compare said return addresses of said child process to said address in said instrumented code space which generated said fault upon execution of said child process.

11. An apparatus, having a processor, for reverting a process in an in-line instrumented state to an uninstrumented state, the apparatus comprising:

means for receiving a child process having inherited an instrumented parent process' context including the parent's program text that may have been modified by instrumentation resulting in an instrumented code space;

means for modifying text segment portions selected from said child process resulting in an uninstrumented code space that is an uninstrumented version of said instrumented code space;

means for unmapping said instrumented code space such that said instrumented code space is inaccessible to said child process;

means for updating an instruction pointer to point to said uninstrumented code space provided said instruction pointer resides in said instruction code space; and means for executing said child process and, provided said child process generates a fault by seeking to access an address in said instrumented code space which is inaccessible due to being unmapped, providing an address in said uninstrumented code space that corresponds to said address in said instrumented code.

12. The apparatus of claim 11 wherein said selected text segment portions are selected from the group consisting of: breakpoints, branches, switch tables, procedure lookup tables (PLTs) for said instrumented code space.

13. The apparatus of claim 11 wherein said instrumented code space is comprised of shared memory.

14. The apparatus of claim 11 further comprising: means for unwinding a call stack of said child process and recording return addresses of said child process.

15. The apparatus of claim 14 further comprising: means for comparing said return addresses of said child process to said address in said instrumented code space which generated said fault upon execution of said child process.

* * * * *

UNITED STATES PATENT AND TRADEMARK OFFICE
CERTIFICATE OF CORRECTION

PATENT NO. : 7,249,349 B2
APPLICATION NO. : 10/017342
DATED : July 24, 2007
INVENTOR(S) : Robert Hundt et al.

It is certified that error appears in the above-identified patent and that said Letters Patent is hereby corrected as shown below:

In column 10, line 7, in Claim 6, delete "process'context" and insert -- process' context --, therefor.

Signed and Sealed this

Eighth Day of July, 2008

JON W. DUDAS
*Director of the United States Patent and Trademark Office*